J. LYTCH.
Cotton Planter.

No. 103,759.

Patented May 31, 1870.

Witnesses.
Chas. E. Upperman
P. A. Devine

James Lytch,
By his Attorneys,
Upperman & Johnson

United States Patent Office.

JAMES LYTCH, OF LAURINBURG, NORTH CAROLINA.

Letters Patent No. 103,759, dated May 31, 1870.

IMPROVEMENT IN COTTON-SEED PLANTERS.

The Schedule referred to in these Letters Patent and making part of the same.

*To all whom it may concern:*

Be it known that I, JAMES LYTCH, of Laurinburg, in the county of Richmond and State of North Carolina, have invented certain new and useful Improvements in Cotton-Seed Planters; and I do hereby declare that the following is a full, clear, and exact description thereof, reference being had to the accompanying drawing of the same, which makes part of this specification, and in which—

Figure 1:
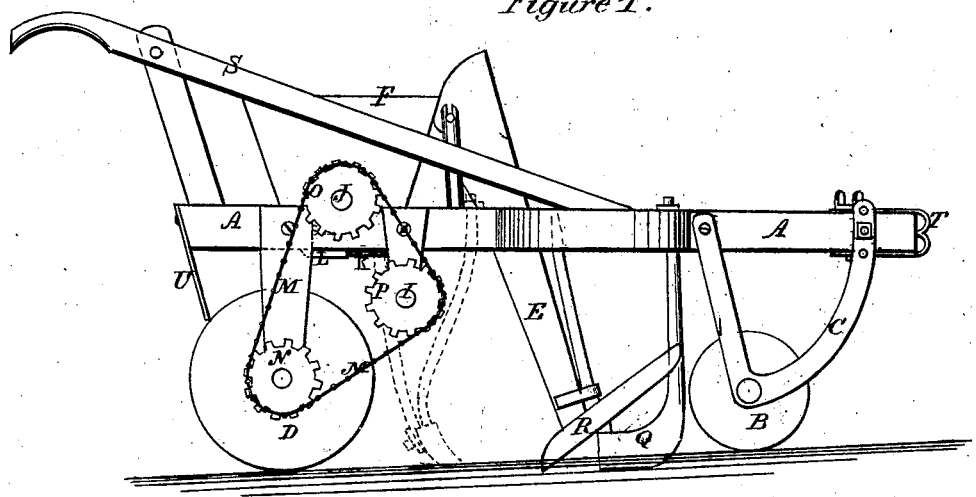
Figure 1 represents an elevation of a machine embracing my improvements.
Figure 2:
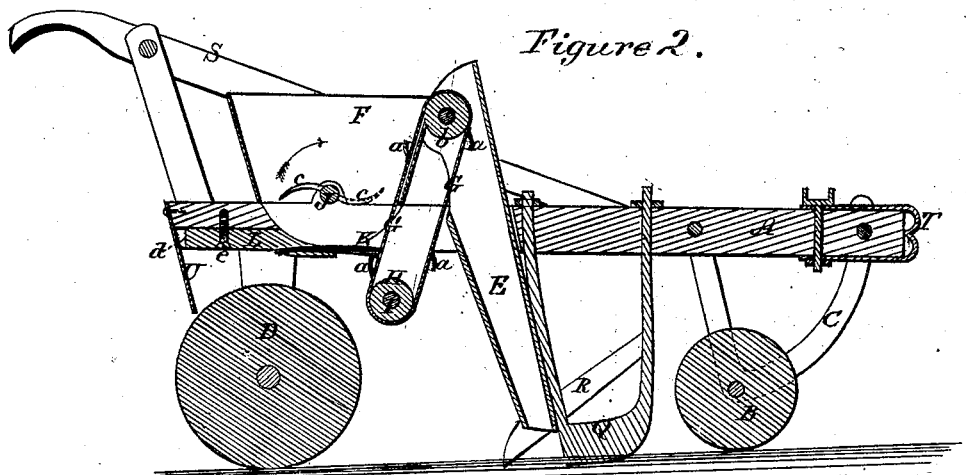
Figure 2 represents a vertical longitudinal section of the same.
Figure 3:
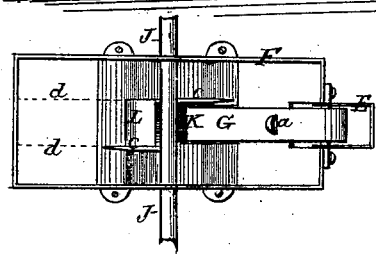
Figure 3 represents a top view of the hopper and the endless belt of buckets.
Figure 4:
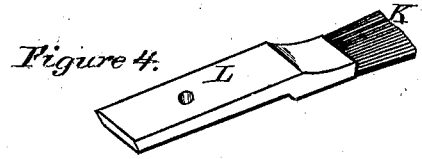
Figure 4 represents a view, in perspective, of the brush which forms the flexible bottom of the hopper.

In planting cotton-seed, it has been found very difficult to effect their discharge from the hopper in proper quantities, and at regular intervals, by reason of their tendency to adhere to one another, and from their lightness. This is accomplished by my improvements, which consist in constructing the hopper with a yielding or flexible closed bottom, in connection with an endless band of buckets revolving in contact with said flexible bottom, so that the buckets will readily pass into and through said hopper, while its bottom is automatically opened and closed by the action of said buckets.

Also, in making the arms of the stirrer or spider for agitating the seed curved in a direction opposite to their motion, for the purpose of rendering them self-clearing.

In the accompanying drawing—

A represents the frame or beam of the machine, supported at its front end by a roller, B, mounted in segmental adjustable plates, C, to regulate its distance beneath the frame, and at its rear end by a supporting and covering roller, D, mounted in arms projecting from said frame; and intermediately between these supporting-rollers B D an inclined tube, E, is arranged for conducting the seed into the soil.

This tube extends above the frame, and forms a junction with the front portion of the top of the hopper F, which is secured to the frame directly in the rear of said tube.

The bottom of the hopper F is made concave, and provided with an opening, into and through which one side of an endless band, G, of buckets a revolves, while the other side of said band runs over a small pulley, b, at the top of the conducting-tube, and passes into and through the upper end of said conducting-tube, whence it passes beneath the frame around a pulley, H, on a transverse shaft, I, from which it receives its motion.

The endless band of buckets is inclined in a direction opposite to that of the conducting-tube E, so that the buckets will readily pass into and out of its upper end.

Within the hopper F is arranged a transverse shaft, J, provided with two or more arms c curved in an opposite direction to their motion, so as to revolve nearly in contact with the band of buckets, and thus always insure their being filled with seed while their convex curved sides pass readily through the seed in such manner as to effectually stir them and prevent any fiber from adhering to or winding around them which would clog them, as would be the case if they entered the seed point first.

The bottom of the hopper F is formed by means of a brush, K, of stiff bristles, which fills the opening in the bottom thereof, and is adjusted always in contact with the endless band of buckets G, being held to such adjustment by a set-screw, e.

This brush K is fitted in the end of an adjustable arm, L, secured to the under side of the frame A, in ways d, so as to admit of its adjustment toward or from the band, as it wears, and thereby forms a bottom constantly closed to the seed, but yielding and closing automatically during the passage of the buckets.

The brush can easily be replaced in its stock whenever required by simply removing the latter from its ways and refitting it with a new brush.

The motion of the stirrers c, and the endless apron of buckets G, is derived from the supporting and covering-roller D, by means of a chain, M, passing around a toothed wheel, N, on the end thereof, and similar wheels O P of equal diameter on the projecting ends of the shafts J of the stirrers, and lower pulley H of the band of buckets.

Directly in front of the conducting-tube the colter Q is arranged, extending just below the discharge-opening of said tube E for forming the furrow for the seed.

From this colter extend rearward two fixed coverers R, so as to embrace the discharging end of the tube E, and enter the soil in the rear thereof.

To convert the machine from a cotton-seed to a grain planter and cultivator, the colter Q is removed and a cultivator-tooth secured to the frame in its place, and immediately in front of the covering and supporting-roller two other cultivator-teeth are secured to the frame, on either side of the conducting-tube, one of which is shown in dotted lines in fig 1.

The machine is provided with handles S, clevis T, and a scraper, U, for the covering-roller attached to the rear end of the frame.

Having described my invention,

I claim—

1. The flexible brush K, arranged so as to form the bottom of the hopper, and made adjustable, as described, in combination with an endless band of buckets, so arranged and operating as to open said flexible bottom automatically by the passage of the buckets $a$, and which will close by its elasticity, as herein shown and described.

2. The stirrers $c$, curved and operated so as to enter the grain back foremost, for the purpose of passing through the seed, so as to clear themselves of fiber, and thus prevent clogging, substantially as described.

JAMES LYTCH.

Witnesses:
T. H. UPPERMAN,
T. S. GENIN.